April 7, 1959     W. L. BEHREND     2,881,388
TELEVISION TEST SIGNAL GENERATOR AND METHOD OF USE
Filed July 1, 1954     3 Sheets-Sheet 1
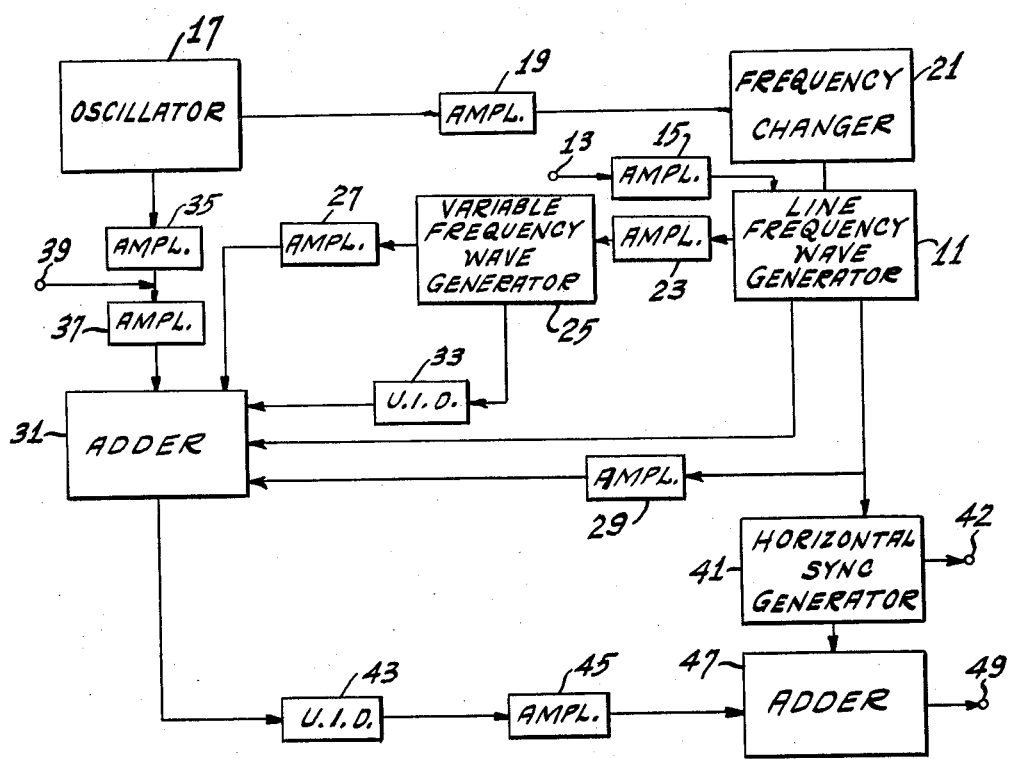
*Fig_1*
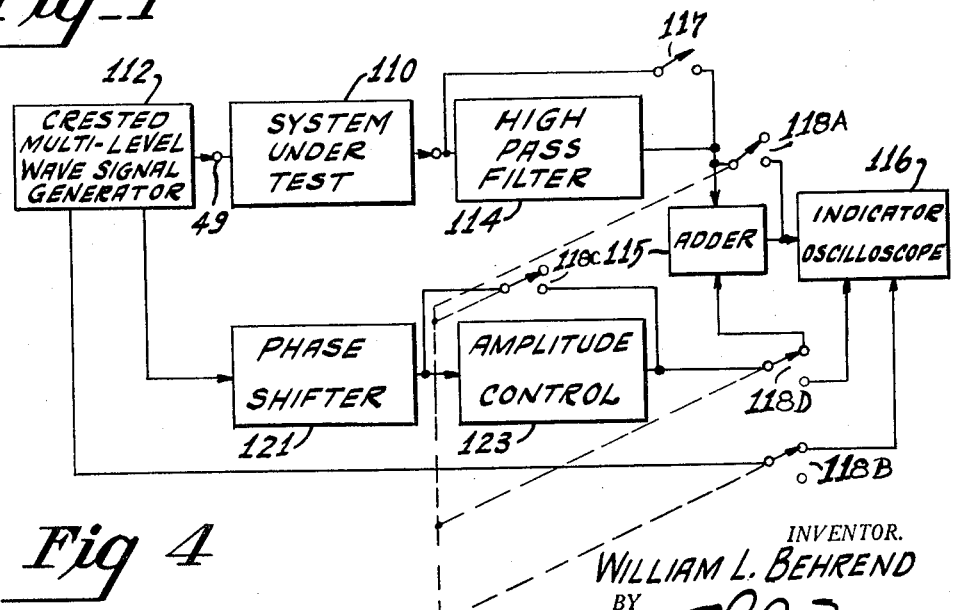
*Fig 4*
INVENTOR.
WILLIAM L. BEHREND
BY
ATTORNEY

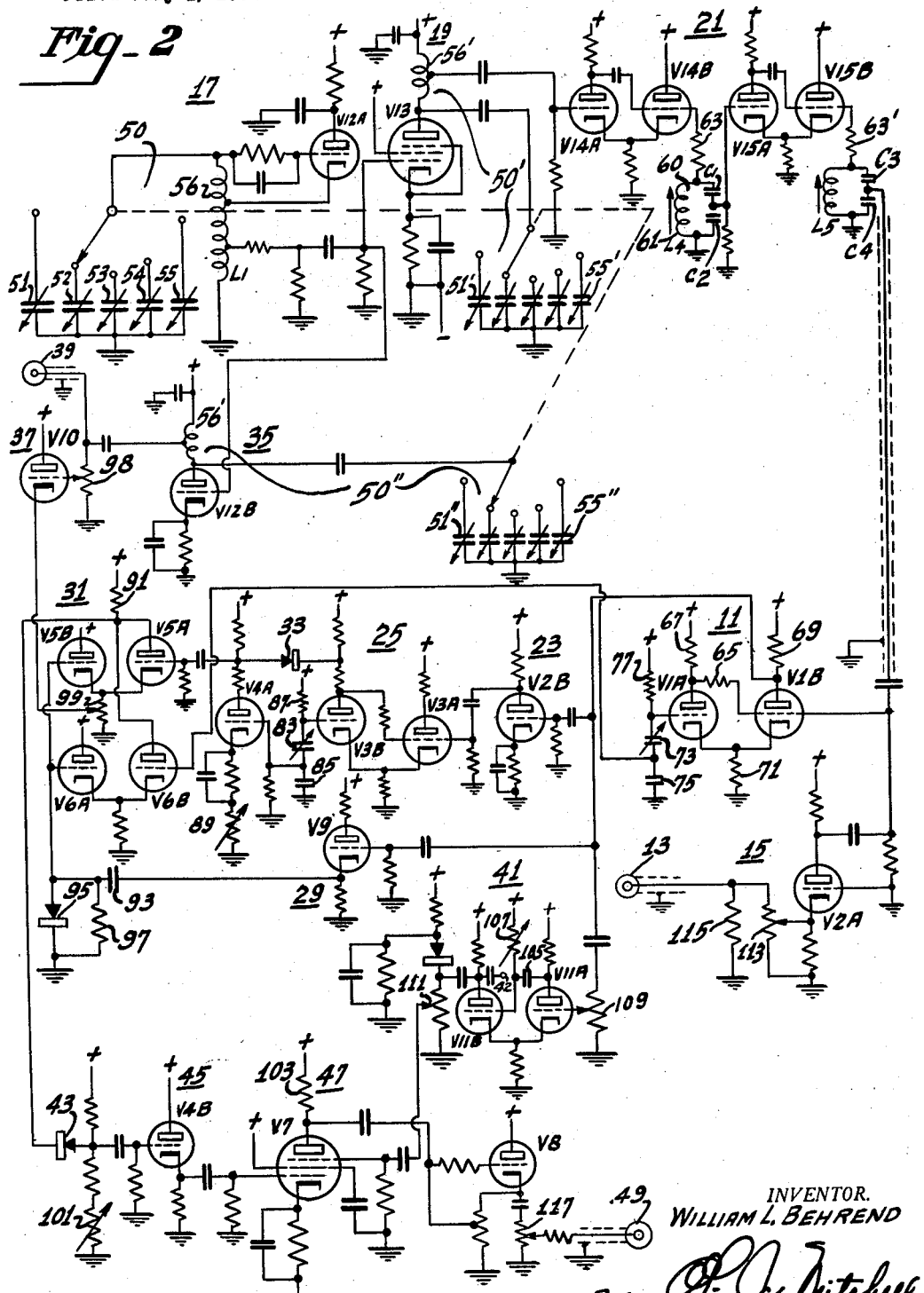

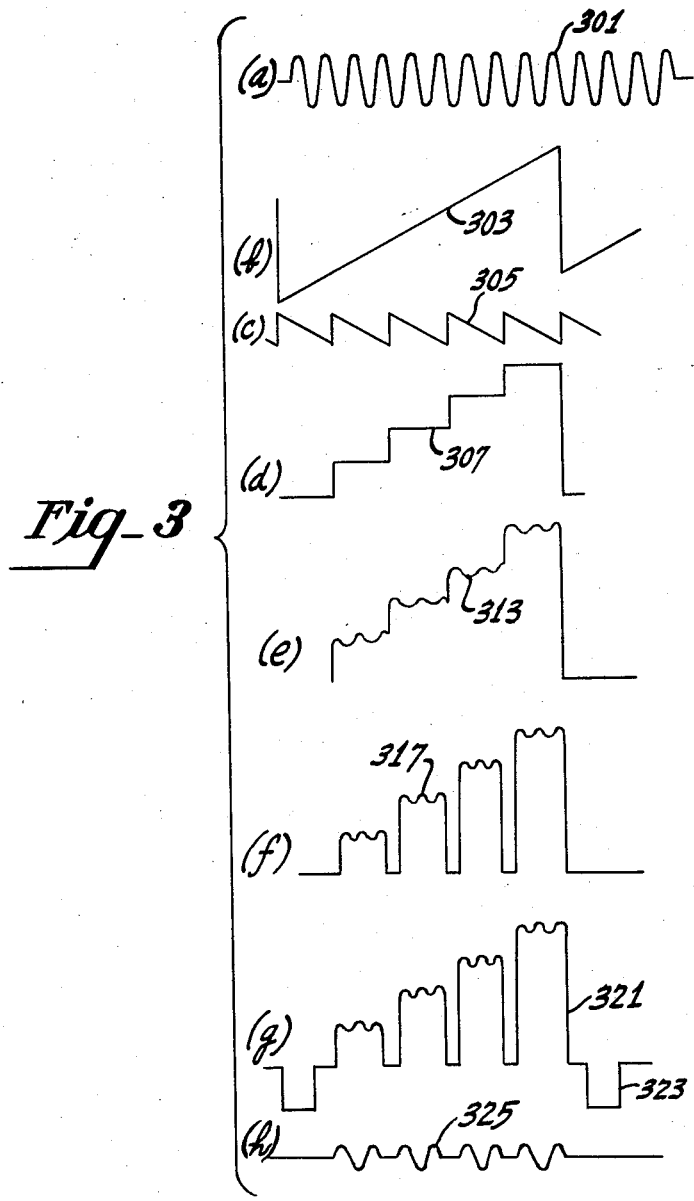

2,881,388

TELEVISION TEST SIGNAL GENERATOR AND METHOD OF USE

William Louis Behrend, Princeton, N.J., assignor to Radio Corporation of America, a corporation of Delaware Application July 1, 1954, Serial No. 440,807

The terminal fifteen years of the term of the patent to be granted has been disclaimed

4 Claims. (Cl. 324—57)

The invention relates to signal generating circuit arrangements and it particularly pertains to signal generators for testing apparatus for translating complex wave signals such as used in color television broadcasting and the like.

In working with color television circuits and systems it is necessary to check the incremental gain, now termed the differential gain in F.C.C. regulations, over a band of frequencies and to check the phase/level characteristic, now termed the differential phase in F.C.C. regulations, of the apparatus, circuits, and systems. By phase/level characteristic is meant that change in phase of a sine wave which takes place as the level of the A.C. axis is changed with respect to the black level during the horizontal line scanning time.

In the past the above-mentioned characteristics were determined merely by testing the apparatus for translating the complex wave signals at different frequencies and at different signal levels and amplitudes. A number of separate signal generators were used in combination tests and the results were then correlated for a final determination as to the index of worth of the apparatus under consideration. Prior art arrangements which were very useful were based on the use of a step wave signal generator to establish levels and the use of a further generator to modulate the levels with sine waves, sawtooth waves or the like. It was soon recognized, however, that some special test signal generator should be devised which would provide means for a relatively rapid determination of the desired index of the apparatus to be used in television signal broadcasting and the like, without the necessity of so many separate pieces of test equipment.

An object of the invention is to provide an improved signal generator for producing a test wave signal useful for testing complex wave signal translating apparatus.

Another object of the invention is to provide a circuit arrangement for rapidly and accurately determining the incremental gain over a band of frequencies of complex wave signal translating apparatus.

Another object of the invention is to provide a circuit arrangement for rapidly determining the amplitude/frequency response of complex wave signal translating apparatus at a plurality of discrete frequencies within a given band of frequencies.

A further object of the invention is to provide an improved method for rapidly determining the phase/level characteristics of complex wave signal translating apparatus.

A still further object of the invention is to provide an improved arrangement for checking clipping circuits to determine whether the circuit clips all frequencies to the same degree and whether the phase of the signal is changed at the various frequencies.

The objects of the invention are attained in a circuit arrangement including a crested multi-level signal generator according to the invention for applying a test signal to the electric wave translating apparatus or systems under test which consists of bursts of an undulating signal, preferably a sine wave, having the mean axis of the bursts displaced at several different discrete levels with respect to a given reference level. The test signal contains frequency components in the range of video frequencies to be translated by that apparatus and harmonically related to the sweep frequency.

The output of the apparatus under test is coupled to a high pass filter network which removes the low frequency components establishing the different signal levels and the signal bursts remaining are applied to an indicator device for indicating the relative amplitude of the signal bursts. Preferably, the indicator device is in the form of an oscilloscope having a sweep circuit synchronized with the undulating signal generator so that the difference in amplitude of the bursts for the various levels is visually displayed and ascertainable at a glance.

The phase displacement between the signal applied to the input of the apparatus under test and that obtained at the output is indicated by applying a potential varying in accordance with the variations of the undulating signal to the sweep circuit of the oscilloscope and measuring the phase angle by observing the various Lissajous figures. Preferably, a phase shifting device is inserted in the sweep circuit so that known phase increments can be added.

The phase/level characteristic is readily determined for the apparatus under test by applyin the signal bursts as translated at the output of a high pass filter to an adder circuit together with potential varying in accordance with the undulating signal from the test signal generator through the intermediary of a calibrated phase shifter and a calibrated amplitude control connected in series and applying the resultant wave to the oscilloscope. The phase shifter and the amplitude control are adjusted until the bursts as displayed on the oscilloscope are cancelled, as indicated by the wave disappearing into the reference line on the face of the oscilloscope. The amplitude and phase for each level are determined from the calibrated scales of the respective controls.

The signal generator according to the invention is constituted by a circuit arrangement including an undulating signal generating circuit producing a sine wave signal of frequency representative of the video modulation waves which the apparatus under test is to translate and an integral multiple of the frequency of the horizontal deflection wave of the system under test, a pulse wave generating circuit operating at the horizontal deflection frequency, a frequency changing circuit coupled between the sine wave and the pulse wave generating circuits to synchronize the same, sawtooth wave generating circuits coupled to the pulse wave generator, a wave combining circuit coupled to the sawtooth wave generating circuits, to said pulse wave generating circuit and to the sine wave generating circuit. The sawtooth wave generating circuits are arranged to produce sawtooth waves at different repetition rates proportional to the line frequency rate and are connected to the wave combining circuit in antiphase relationship which in the absence of any other signals would produce a step wave in the wave combining circuit. Another pulse generating circuit coupled to and triggered by one of the sawtooth wave generating circuits is also connected to the wave combining circuit and is arranged to blank out the risers that would occur between the steps of the potential or virtual step wave. By means of a connection between the sine wave generating circuit and the wave combining circuit the treads of the potential step wave are crested at the operating frequency of the sine wave generating circuit. The signal generator according to the invention is thus arranged to produce a wave which may be visualized as a periodically reappearing series of straight-sided pulses uniformly varying in height in a given direction and each topped with a sine wave. This signal, mainly for want of a better descriptive name, is termed a crested multi-level wave signal. Preferably, the output from such a signal generator is mixed with horizontal synchronizing signals and the circuitry lends itself to incorporation of a simple oscillating circuit for so providing the desired synchronizing signal pulses.

In order that the invention may be more clearly understood and readily put to practice, a description of a specific embodiment thereof, by way of example only, is given below with reference to the accompanying drawing forming a part of the specification and in which:

Fig. 1 is a functional diagram of a test signal generator according to the invention;

Fig. 2 is a schematic diagram of a test signal generator for performing the functions outlined in Fig. 1;

Fig. 3 is a graphical representation of wave forms obtained at pertinent points in the circuit shown in Fig. 2; and Fig. 4 is a functional diagram of a setup for determining the incremental gain and/or the phase/level characteristics, and the like, of apparatus for translating complex wave signals.

Prerequisite to the understanding of the system or arrangement for determining the incremental gain or the phase/level characteristics of a complex wave translating system, is the understanding of the general type of test signal generator used in such a system according to the invention. The functional diagram of such a signal generator is shown in Fig. 1. The crested multi-level output signal desired for testing complex wave apparatus, such as television signal translating apparatus or systems, is centered about a horizontal sweep frequency pulse wave generating circuit 11. For testing present television systems, the line frequency pulse wave generator 11 is a 15.75 kc. astable recipro-conductive circuit or multivibrator arranged to be free-running or synchronized selectively. Preferably, the pulse wave generator is arranged to be synchronized with synchronizing signals applied at synchronizing signal input terminals 13 through the intermediary of amplifier 15 if desired, or synchronized with a source of undulating signal from a local oscillator 17 coupled by means of an amplifier 19 and a frequency changer 21 to the line frequency pulse wave generator 11. It may be desirable that the oscillator 17 be synchronized with the line frequency wave generator 11. Two general circuit arrangements are immediately suggested: (a) the frequency changer 21 is in the form of a frequency multiplier which multiplies the pulse wave obtained from the line frequency wave generating circuit 11 to a harmonic frequency at which the oscillator 17 can be synchronized; or (b) the frequency changer 21 is a frequency divider which is driven by the output of the oscillator 17 to a sub-multiple of the line frequency wave to synchronize the pulse generating circuit 11. The line frequency wave generator is arranged to produce pulse and sawtooth waves of the same repetition rate. The pulse wave output of the line frequency pulse wave generator 11 is applied to an amplifier 23 which is coupled to a variable frequency wave generator 25. Preference is given to the astable reciproconductive circuit or multivibrator for both the line frequency and variable frequency wave generating circuits 11 and 25. The variable frequency wave generating circuit is arranged to produce a square wave and a sawtooth output signal which is several times the frequency of the line frequency wave generating circuit 11.

In the signal generator according to the invention the various levels at which the test signal wave is to be produced are established by effectively generating a step wave signal upon the treads of which it is desired to superimpose a crest of higher frequency modulation. The method of obtaining the step wave in the test generator according to the invention consists of subtracting a high frequency sawtooth voltage. The sawtooth wave developed by the line frequency wave generating circuit 11 is combined in anti-phase relationship with the sawtooth wave developed by the variable frequency wave generating circuit 25 in such manner that if the two waves were algebraically added together a step wave would be formed having a number of steps depending on the frequency to which the variable frequency wave generator is tuned. The high frequency sawtooth wave from the variable frequency wave generator 25 is applied through the intermediary of an amplifier 27 along with the low frequency sawtooth wave obtained directly from the line frequency wave generating circuit 11 to an adder type of wave combining circuit 31. For convenience as later described hereinafter, the risers of the potential step wave are blanked out by flat-topped blanking pulses derived from the variable frequency wave generating circuit 25 and applied by way of a unilateral impedance device 33 to the wave combining circuit 31. A sine wave signal, obtained from the oscillator 17, is applied through the intermediary of a pair of amplifiers 35 and 37 to the wave combining circuit 31. The sine wave is preferred because it is free of harmonic components that any other form of wave would have and which would tend to complicate the analysis. In the generator according to the invention the sine wave generating circuit or oscillator 17 is arranged to produce several sine wave voltages, each harmonically related to the line frequency wave. If desired, however, sine waves of other frequencies or other wave forms may be applied at the external modulation input terminals 39 for application to the wave combining circuit 31 by way of the amplifier 37. A clamping pulse is also obtained from the variable frequency wave generator 25 and applied to the wave combining circuit 31 to cause each step of the multi-level output wave signal to start near the black level.

Although a useful signal is presented at the output of the combining circuit 31, it is preferable that horizontal synchronizing pulses be inserted in the output signal. This is done by triggering a horizontal synchronizing pulse generator 41 by a pulse from the line frequency pulse generating circuit 11. The horizontal synchronizing pulses are combined with the composite wave from the wave combining circuit 31 as applied through a unilateral impedance device 43 and an amplifier 45 in an output wave combining circuit or adder 47 coupled to the crested multi-level signal output terminals 49. With this added circuitry the crested multi-level signal is provided with horizontal snychronizing pulses which are particularly desirable in testing standard television wave translating systems and apparatus.

A schematic diagram of a circuit arrangement for carrying out the functions of the signal generator outlined in Fig. 1 is shown in Fig. 2. In the particular embodiment shown the oscillator 17 produces an undulating signal of pure sine wave form at one of five frequencies 0.788, 1.58, 2.36, 3.54 and 3.94 mc. which are very close to being exact multiples of the 15.75 kc. line frequency, the nominal frequencies of which are 0.8, 1.5, 2.5, 3.5 and 4.0 mc. The frequency of the sine wave generating circuit 17 is changed by varying the contents of a tank circuit 50 by switching a plurality of capacitors 51–55 across a tank inductor 56 to which a triode tube V12A is connected in a known Hartley oscillator circuit. The output of the sine wave generating circuit 17 is applied to a tuned amplifier 19 comprising an electron discharge device or pentode vacuum tube V13 and resonant circuit 50' comprising a plurality of capacitors 51'–55' and an inductor 56' closely similar to the circuit 50.

The output of the amplifier 19 is applied to the frequency changing circuit 21 which in this instance is a two-stage frequency dividing circuit producing a constant output frequency wave of 78.75 kc. The first stage of the frequency dividing circuit is constituted by a pair of tubes V14A, V14B in a modified cathode-coupled sine wave oscillator circuit. The frequency of this circuit arrangement when it is not locked, is determined almost entirely by the natural resonant frequency of a tuned circuit 60 connected to the grid of the output tube V14B. The tube constants tend to decrease the natural frequency a slight amount, making the frequency output of the divider fairly stable with variations in operating voltage. Locking potential from the sine wave generating circuit 17 is applied to the grid of the input tube V14A to cause the tuned circuit 60 to operate at a sub-harmonic of the input frequency. A resistor 63 in the grid circuit of the tube V14B is arranged to aid in harmonic generation for locking purposes. The value of this locking resistor 63 is critical, although it may be readily determined experimentally. The first stage of this frequency dividing circuit 15 produces a constant output frequency of 393.75 kc. and divides the output signal of the sine wave generating circuit 17 by the factors 10, 9, 6, 4 and 2 depending on the respective frequency of the oscillations from the sine wave generating circuit 17. The following stage, comprising the tubes V15A, V15B, is a frequency divider of the same type but which divides constantly by a factor of 5 to lock the 15.75 kc. pulse generating circuit 11 in synchronism. A more complete description of such frequency dividing circuitry is found in the article, "Modified Locked-Oscillator Frequency Dividers" by P. G. Sulzer in the Proceedings of the IRE for December 1951.

The pulse generating circuit 11 comprises an astable reciproconductive circuit or multivibrator operating at a frequency of 15.75 kc. Actually this multivibrator is arranged to have a natural period of oscillation slightly lower than this frequency so that it will positively respond to triggering by the output of the frequency dividing circuit 21. At the same time, however, the frequency is made as near the 15.75 kc. as possible so that the multivibrator may be used in the free-running condition under circumstances in which such operation is desirable. The pulse generating circuit 11 is arranged to produce a positive going pulse for horizontal blanking purposes and to generate a sawtooth wave having the repetition rate of 15.75 kc. The grid of the oscillator V1B is made positive by means of a resistor 65 connected to the load resistor 67 of the tube V1A, and the anode resistor 69 is given a low value of resistance compared to that of the load resistor 67 to insure sufficient flow of plate current in the tube V1B to hold the tube V1A cut off due to the common cathode voltage developed across a common cathode resistor 71. A pair of capacitive elements 73 and 75 in the grid circuit of the tube V1A are charged exponentially through a resistor 77 of relatively high value until the grid voltage of the triode V1A is a positive value large enough to cause anode current conduction of the triode V1A. The capacitive element 73 is adjustable, composed preferably of a fixed capacitor in shunt with a variable capacitor, in order to provide means for adjustment of the frequency of the multivibrator. The drop in anode voltage of the triode V1A is arranged to drop the voltage on the grid of the triode V1B below the cutoff value to block the tube. The cathode voltage also drops due to the anode current of the triode V1A being less than that of the triode V1B so that the triode V1A reaches grid conduction condition and the capacitive elements 73, 75 are discharged through the tube V1A. The charging cycle is cut off at a time when the charging rate is substantially linear, thereby producing a sawtooth potential wave. The anode potential of the triode V1A is arranged to increase in the same manner that the grid voltage decays. The anode potential of the triode V1A is then increased to the point where the grid voltage of the triode V1B exceeds the cutoff value, causing anode current conduction of the triode V1B to begin the next cycle. The negative synchronizing pulse obtained from the grid circuit of the frequency divider tube V15B applied to the grid of the triode V1B causes the triode V1A to conduct at a time earlier than the time it would conduct in response to the natural frequency characteristics of the circuit. This negative synchronizing signal can be obtained from some external source and applied at the terminal 13 if desired. The voltage across the capacitive element 75 is substantially a sawtooth wave, as represented by the curve 303 of Fig. 3(b), having a repetition rate of 15.75 kc. A positive pulse at the plate of the other reciproconductive tube V1B is applied to an amplifier tube V2B, the output of which is applied to the triode V3A of the variable frequency wave generating circuit 25 to synchronize the operation of the latter. This generating circuit is another astable reciproconductive circuit or multivibrator comprising the tube V3A—V3B and is of substantially the same structure as the line frequency wave generator 11 except for adjustable components which permit operation over a range of 47 to 315 kc. The higher frequency sawtooth voltage developed across the capacitive element 85 as represented by the curve 305 of Fig. 3(c), is applied to the grid of an amplifier tube V4A which inverts the wave so that if it were added to the wave form across the capacitive element 75 a step wave, as shown by curve 307 of Fig. 3(d) would result. A variable resistor 89 in the cathode circuit of the tube V4A is arranged to control the gain of the amplifier tube V4A to vary the tilt of the treads or signal levels. The relative magnitudes of the high frequency sawtooth waves determines the tilt of the treads in a step wave formed in this manner, so that for a given amplitude of one sawtooth wave the tilt may be adjusted by varying the amplitude of the other. The addition is made in the wave combining circuit 31 comprising four triode tubes V5A-V6B. The low frequency sawtooth wave across the capacitive element 75 is applied directly to the grid of the tube V6B and the high frequency sawtooth wave across the capacitive element 85 is applied to the grid of the tube V5A by way of the phase inverting tube V4A. The negative pulse at the anode of the tube V3B is applied by way of the unilateral impedance device 33, which is preferably a simple germanium diode, to combine with the negative going sawtooth at the grid of the adder tube V5A. The purpose of this connection is to subtract a negative pulse after each sawtooth causing each step in the composite signal to be formed to start near the black level. The three signals are added in the anode load resistor 91 common to the adder tubes V5A and V6B to produce steps or signal levels in between horizontal blanking periods. The blanking periods are shown by the curves 317 and 321 of Fig. 3(f) and (g). Positive pulses obtained from the anode of the tube V1B are applied through a cathode follower V9 to the grids of both adder tubes V5B and V6A. These positive pulses cause the anode current of the tubes V5B and V6A to rise sufficiently to block the triodes V5A and V6B during the pulses. Thus the anodes of the tubes V5A and V6B supply the operating potential during the duration of the pulses, or positive pulses for horizontal blanking are formed at the anodes. The coupling capacitor 93 between the cathode of the tube V9 and the grids of the adder tubes V5B and V6A is charged during the positive pulse through a crystal diode element 95. During the time between pulses, the coupling capacitor 93 discharges through the back resistance of the diode element 95 and a resistor 97 having a relatively high value of resistance, holding the adder tubes V5B and V6A cut off.

A tuned amplifier circuit 35 is coupled to the sine wave generating circuit 17 to amplify the signal obtained therefrom for application to the grid of a cathode follower V10, the cathode of which is connected to the cathodes of the adder tubes V5A, V5B. The amplifiers 35 and 37 are arranged so that the sine wave at the terminal 39 may be supplied to an external circuit if desired, say for phase/level measurement, without adversely affecting the operation of the test signal generator. The amplitude of the sine wave at the cathodes of the adder tubes is varied by adjusting the tap on the grid resistor 98 of the cathode follower V10 or the common cathode resistor 99. By this connection treads of the steps have superimposed thereon sine wave voltages which are synchronized with the horizontal line frequency as represented by the curve 317 of Fig 3. The composite signal obtained across the load resistor 91 is preferably clipped by means of a unilateral impedance device 43, which is preferably another simple germanium diode element. Since the horizontal blanking pulse formed in the wave combining circuit 31 is not perfect, the diode element 43 clips or shapes the pulse so that it is flat. The positive potential on the anode of the crystal diode 43 can be varied by adjustment of a variable resistor 101 to vary the conduction point of the diode 43—thus changing the setup of the composite signal. The setup is usually defined as the height above the reference level of the first step or signal level, but it must be remembered that the differences between steps or signal levels are not changed by changing the setup The composite signal, as shown by curve 317, is thereafter applied to the grid of a cathode follower tube V4B for application to the control grid of a pentode vacuum tube V7 in the wave combining circuit 47 The positive square top pulse appearing at the anode of the tube V1B is differentiated and then applied to a monostable reciproconductive circuit comprising the tubes V11A and V11B of the horizontal sync pulse generator 41. The grid of the tube V11B is at positive supply potential and the cathode voltage, due to the current flowing through the tube V11B blocks the tube V11A The positive pulse applied to the grid of the tube V11A causes the coupling capacitor 105 to start charging due to the drop in anode voltage of the tube V11A. The charging current causes the grid voltage of the tube V11B to drop to the point where the tube is blocked. The discharge current then diminishes to a value where tube V11B becomes conducting and blocking the tube V11A until the next trigger pulse is applied. Thus the width of the synchronizing pulse can be adjusted by changing the charge time constant for the coupling capacitor 105 by varying the resistor 107. In this wave combining circuit 47 the five microsecond pulse obtained from the anode circuit of the tube V11B in the horizontal sync pulse generator 41 is applied to the suppressor grid of the pentode tube V7 to insert horizontal sync pulses in the composite signal to provide an output signal. The addition takes place in the anode resistor 103 of the pentode tube V7.

The output signal from the test generator is preferably obtained through the intermediary of a cathode follower tube V8 since the impedances usually found in the type of wave translating equipment to be tested are usually much lower than that appearing across the pentode tube V7. Obviously, any impedance matching device can be used for this purpose. The level of the output signal at the output terminals 49 is about zero to 2.5 volts peak to peak in the circuit arrangement shown.

Wave forms obtained with the test signal generator according to the invention are graphically represented in Fig. 3. The curve 301 represents the output of the sine wave generating circuit 17 at a given frequency. The curve 303 represents the sawtooth wave of line frequency repetition rate synchronized with the sine wave of the curve 301, while the curve 305 represents a sawtooth wave obtained from the variable frequency generator 25 for producing four levels of undulating signal. The curve 307 represents a step wave that would be generated if the curves 303 and 305 were added without blanking signal or any other wave forms. The curve 313 represents the step wave signal of curve 307 as it would be modulated by the sine wave represented by the curve 301. It should be understood that the relative frequency difference between the various waves is only roughly shown. In actuality a sine wave crest of many cycles will appear on each tread of the step wave. The curve 313 is supplied to show the interfering wave form which would occur along the risers of the step wave as shown in 307. The curve 317 represents the composite signal comprising the step wave of curve 307 with the risers blanked by the pulse wave which is obtained from the variable frequency wave generator 25 and modulated by the sine wave of the curve 301 to produce the crested multi-level wave signal represented by the curve 317. The curve 321 shows the output signal of the signal generator according to the invention which is complete with horizontal synchronizing pulses 323.

A flexible test set-up is shown in Fig. 4. The input circuit of the wave translating system test 110 is connected to the output terminals 49 of the crested multi-level wave signal generator 112 according to the invention. Auxiliary apparatus which are selectively connected into the test circuit arrangements as desired comprise a high-pass filter 114, an adder circuit 115, an indicator oscilloscope 116, a high-pass filter cutout switch 117, a selector switch 118, a phase shifter 121, and an amplitude control 123. For determining the incremental gain of the system under test the selector switch 118A is set to connect the output of the high-pass filter to the vertical plates of the indicator oscilloscope directly and the high-pass filter cutout switch 117 is open so that the high-pass filter is in the circuit. The indicator oscilloscope sweep is synchronized with the signal generator 112 by means of a connection between the output terminals 42 of the horizontal synchronizing pulse generating circuit 41 of the crested multi-level signal generator 112 by way of the second section of the selector switch 118B. The high frequency components of the signal passed by the system under test are applied to the indicator oscilloscope 116 upon which is displayed the wave form represented by curve 325 of Fig. 3. The high-pass filter 114 removes the low frequency components, that is, the components producing the difference in the signal levels, so that the relative amplitudes of the sine wave signal bursts passing through the system under test are readily apparent on the face of the oscilloscope 116. The variation in amplitude of the sine waves is readily discernible within ±3%. A rapid check of the amplitude/frequency response of any system under test is available at the same time, if desired, since the only time required to make this check is that in turning the selector switch on the sine wave generating circuit 17 of the signal generator 112 through the five positions and noting the relative amplitudes of the signals displayed on the oscilloscope.

This same arrangement can be used to determine the phase/level characteristic of the system under test at the five frequencies generated internally, or any other frequency for which the system under test is designed, which must be obtained from an external source. The composite signal at the output of the apparatus under test as passed by the high-pass filter 114 is placed directly on the vertical plates of the indicator oscilloscope 116 through the switch section 118A which is closed. The undulating signal from the sine wave generating circuit 17, which is available at the terminals 39 on the test instrument 112, is passed through the amplitude control cutout switch 118C to the calibrated phase shifter 121 and through the closed switch section 118D to the horizontal plates of the indicator oscilloscope 116. The phase shifter 123 is then adjusted to close the Lissajous figure for the sine wave on each of the signal levels. One can judge within ±5° if the trace is closed for each of the levels. If a calibrated phase shifter is used the phase can be determined to within ±2°.

This same output wave form may be used to check clipping circuits to determine whether the circuit clips the same amount at all frequencies and if the phase of the signal is changed at any of the various frequencies.

An alternate arrangement for determining the phase/level characteristic of the system under test 110 utilizes the adder circuit 115 and the calibrated amplitude control 123. The output of the high-pass filter 114 is applied to the adder circuit 115 along with the output of the phase shifter 121 and amplitude control 123 and the resulting signal is applied to the vertical plates of the indicator oscilloscope 116. Here the amplitude control 123 is varied as required and the phase shifter 121 is adjusted until the signal bursts as displayed on the oscilloscope disappear into the reference line. As this addition is made the sine wave output from the phase shifter 121 will appear in the blanking periods so that when the signal burst as translated by the apparatus under test and the high-pass filter are reduced to the reference line, the blanking periods will be indicated on the oscilloscope by the appearance of the sine wave signal.

For measurement of the effect of the color subcarrier on an apparatus or a system, a sine wave at the color subcarrier frequency is added to the various levels through the external terminals 39 provided. The line frequency multivibrator 11 is locked to an external horizontal synchronizing signal at the terminals 13. The incremental gain of the system is then measured at the frequency of the color subcarrier through the use of the high-pass filter 114 as mentioned previously.

The phase/level characteristic of the system at the color sub-carrier frequency is measurer accurately by the same method as used for measuring the relative phase of the color bars. The test procedure is to pass the multi-level signal, with the added sine wave crest at the color sub-carrier frequency, through the system under test. At the output of the system the crested multi-level signal is passed through the high-pass filter 114 and combined with the sine wave at the color sub-carrier frequency which has passed through the calibrated amplitude control 123 and the phase shifter 121. The amplitude and phase of the sine wave are then changed until the signal which has passed through the system under test is cancelled to zero for each signal level. The magnitude of the phase shift and the amplitude change are then indicated by the readings on the calibrated instruments. In this measurement the relative phase and amplitude is obtained for one level at a time. The test wave generator has a variation of about 1 degree from the first to the last level. Therefore, for very accurate measurements, the output signal of the test generator should be measured at the input to the system under test.

In the embodiment shown in the schematic diagram of Fig. 2 the pertinent components were given the values listed.

| Ref. No. | Component | Value |
| --- | --- | --- |
| V1AB, V3AB, V5AB, V6AB, V9 | Vacuum tube | Type 6J6. |
| V2AB, V4AB, V11AB | do | Type 12AU7. |
| V7 | do | Type 6AS6. |
| V8 | do | Type 5687. |
| V10 | do | Type 6AG5. |
| V12AB, V14AB, V15AB | do | Type 12AT7. |
| V13 | do | Type 16AU6. |
| 33, 43 | Diodes | Type 1N34. |
| 51–55 | Adjustable capacitors | 5–50 mmfd. to 70–1300 mmfd. to resonate with coils 56, 56'. |
| 56, 56' | Inductor | 60 turns ¼ Pi-Universal #36 S.S.E. ¼" dia. tap at 10t (center tap 56). |
| L4 | do | 1.6 millihenrys. |
| C1 | Capacitor | 100 mmfd. |
| C2 | do | 1,000 mmfd. |
| L5 | Inductor | 3¼ Pi-Universal #36 S.S.E. ¼" dia. ⅙ spacing, series aiding. |
| C3 | Capacitor | 750 mmfd. |
| C4 | do | 5,600 mmfd. |
| 63, 63' | Locking resistor | 1 kilohm. |
| 65 | Resistor | 18 kilohms. |
| 67 | do | 10 kilohms. |
| 69 | do | 1 kilohm. |
| 71 | do | 6.8 kilohms. |
| 73 | Adjustable capacitive element. | 685–780 mmfd. |
| 75 | Capacitive element | 0.006 mfd. |
| 77 | Resistor | 2 megohms. |
| 83 | Adjustable capacitive element. | 15–200 mmfd. |
| 85 | Capacitive element | 1,800 mmfd. |
| 89 | Tilt Control resistor | 0–1 kilohm. |
| 91 | Resistor | 5 kilohms. |
| 93 | Capacitor | 4 mfd. |
| 97 | Resistor | 2 megohms. |
| 98 | Variable resistor | 0–1 kilohm. |
| 99 | do | 1–1.5 kilohms. |
| 101 | Setup control | 5 kilohms. |
| 103 | Load resistor | 1.8 kilohms. |
| 105 | Capacitor | 50 mmfd. |
| 107 | Sync-width control | 267–367 kilohms. |
| 109 | Sync-lock control | 100 kilohms. |
| 111 | Sync-amplitude control | 1 kilohm. |
| 113 | Variable tapped resistor. | 200 ohms. |
| 115 | Fixed resistor | 120 ohms. |
| 117 | Variable tapped resistor. | 200 ohms. |

The power supply delivered 150 volts positive regulated at the points marked with the plus sign with respect to ground potential.

Other values will be suggested to those skilled in the art for putting the invention to uses other than those specifically mentioned in the example given.

The invention claimed is:

1. A crested multi-level wave signal generator including, a sine wave generating circuit, a frequency dividing circuit coupled to said sine wave generating circuit, an astable reciproconductive circuit coupled to said frequency dividing circuit, a differentiating network coupled to said astable reciproconductive circuit, another astable reciproconductive circuit coupled to said differentiating network and having an operating frequency higher than that of the first said reciproconductive circuit, sawtooth generating networks individually coupled to said reciproconductive circuits, a wave combining circuit, connections applying the outputs of said sawtooth generating networks to said combining circuit in anti-phase relationship thereby to produce a square wave, a connection between said other astable reciproconductive circuit and said combining circuit to superimpose negative blanking pulses on the risers of said step wave to form a multi-level signal wave, and a connection between said sine wave generating circuit and said combining circuit to superimpose a sine wave crest on each level of said signal wave.

2. A crested multi-level wave signal generator as defined in claim 1 and wherein said sine wave generating circuit is selectively operable at a plurality of frequencies each a multiple of the repetition rate of the first said astable reciproconductive circuit and said other astable reciproconductive circuit is variable in frequency over a wide band of frequencies intermediate the frequency of said one reciproconductive circuit and the lowest frequency of said sine wave generating circuit.

3. A crested multi-level wave signal generator as defined in claim 2 and incorporating a synchronizing pulse generating circuit coupled to said one astable reciproconductive circuit and a further combining circuit to interpose synchronizing pulses in said crested multi-level wave.

4. A circuit arrangement for analyzing the operation of an electric wave translating system, including a crested multi-level wave signal generator, a high pass filter network, terminals for coupling said electric wave translating system between said signal generator and said filter network, and apparatus coupled to said filter network to indicate the amplitude of the signal passing through said translating system and said filter network, wherein said crested multi-level wave signal generator comprises a sine wave generating circuit, a frequency dividing circuit coupled to said sine wave generating circuit, a pulse generating circuit coupled to said frequency dividing circuit, a sawtooth generating circuit coupled to said pulse generating circuit and arranged to produce two sawtooth waves of differing frequencies, a phase inverting circuit coupled to said sawtooth generating circuit, a combining circuit coupled to said sawtooth generating circuit, and to said phase inverting circuit to produce a step wave and connected to said sine wave generating circuit to superimpose a sine wave crest on said step wave, and a connection between said sawtooth generating circuit and said combining circuit to superimpose negative blanking pulses on the risers of said step wave.

References Cited in the file of this patent

UNITED STATES PATENTS

| | | |
|---|---|---|
| 2,250,819 | Wolf | July 29, 1941 |
| 2,456,089 | Shenk et al. | Dec. 14, 1948 |
| 2,618,686 | De Lange | Nov. 18, 1952 |
| 2,660,676 | Doba et al. | Nov. 24, 1953 |
| 2,666,179 | Maxwell | Jan. 12, 1954 |
| 2,733,433 | Morrison | Jan. 31, 1956 |
| 2,738,417 | Hunt et al. | Mar. 13, 1956 |

OTHER REFERENCES

Popkin-Clurman: "Radio & Television News," December 1950, pages 40–42.